(12) United States Patent
Shah et al.

(10) Patent No.: US 12,530,982 B2
(45) Date of Patent: Jan. 20, 2026

(54) METHODS AND SYSTEMS FOR PROVISIONING VIRTUAL LAB WITH LEARNING MANAGEMENT SYSTEM

(71) Applicant: Tata Consultancy Services Limited, Mumbai (IN)

(72) Inventors: Viral Prakash Shah, Thane West (IN); Mohit Shukla, Lucknow (IN); Abhishek Gautam Puri, Lucknow (IN); Srijan Saxena, Lucknow (IN)

(73) Assignee: Tata Consultancy Services Limited, Mumbai (IN)

( * ) Notice: Subject to any disclaimer, the term of this patent is extended or adjusted under 35 U.S.C. 154(b) by 44 days.

(21) Appl. No.: 18/422,391

(22) Filed: Jan. 25, 2024

(65) Prior Publication Data
US 2024/0321130 A1  Sep. 26, 2024

(30) Foreign Application Priority Data
Mar. 24, 2023 (IN) .............................. 202321021080

(51) Int. Cl.
*G09B 5/02* (2006.01)
*G06F 9/451* (2018.01)
*G06F 9/455* (2018.01)

(52) U.S. Cl.
CPC .............. *G09B 5/02* (2013.01); *G06F 9/452* (2018.02); *G06F 9/45558* (2013.01); *G06F 2009/4557* (2013.01)

(58) Field of Classification Search
CPC .. G09B 5/02; G09B 5/00; G06F 9/452; G06F 9/45558; G06F 2009/4557
See application file for complete search history.

(56) References Cited

U.S. PATENT DOCUMENTS

2002/0138590 A1* 9/2002 Beams ..................... G09B 7/02
434/362
2005/0227216 A1* 10/2005 Gupta ...................... G09B 7/00
434/322

FOREIGN PATENT DOCUMENTS

IN          202041054268        12/2020

OTHER PUBLICATIONS

Abekiri et al., Platform for hands-on remote labs based on the ESP32 and NOD-red, Scientific African, 19:e01502 (2023).

* cited by examiner

Primary Examiner — Timothy A Musselman
(74) Attorney, Agent, or Firm — FINNEGAN, HENDERSON, FARABOW, GARRETT & DUNNER LLP

(57) ABSTRACT

Current approaches create web based simulated lab type of setups for students/learners in which lab environment is created according to course of student. However, these conventional approaches require student systems to have some basic setup for working on virtual labs. Few available techniques also provide cloud-based virtual labs in which private cloud is created but they use open-source tool for creation. Further, available virtual lab techniques do not provide seamless integration with LMS. Present disclosure provides methods and systems for provisioning virtual lab with learning management system. The system provides virtual desktop that is created on an infrastructure-as-a-service platform. The learner desktop is accessed by a user/learner from respective existing computer system via LMS account. The virtual desktop includes hardware configuration and software packages required to solve one or more problems or perform one or more experiments related to course for which learners have enrolled in LMS.

18 Claims, 7 Drawing Sheets

| receiving, by a virtual lab provisioning system (VLPS) via one or more hardware processors, course details from a learning management system (LMS), wherein the course details comprise a list of a plurality of courses that are offered by the LMS 402 |

| determining, by the VLPS via the one or more hardware processors, a virtual lab configuration for each course of the plurality of courses using an intelligent virtual machine configuration repository, wherein the virtual lab configuration comprises one or more of: a virtual machine requirement, an operating system requirement, a storage requirement, and a list of required software and tools 404 |

| sending, by the VLPS via the one or more hardware processors, the virtual lab configuration determined for each course as a recommended virtual lab configuration for a respective course to the LMS, wherein the recommended virtual lab configuration for each course is reviewed by an administrator to draft a final lab configuration for the respective course 406 |

| receiving, by the VLPS via the one or more hardware processors, the final lab configuration for each course of the plurality of courses and one or more additional inputs from the LMS, wherein the one or more additional inputs comprise one or more of: an infrastructure-as-a-service (IaaS) platform details, a learner list for each course, a lab availability details for each learner in the learner list of each course, a cool off period details for each course, a faculty virtual machine details for each course, an automation script for one or more courses of the plurality of courses, a LMS application programming interface details, and an attempt details for each course of the plurality of courses 408 |

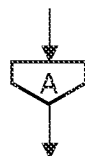

creating, by the VLPS via the one or more hardware processors, a learner desktop for each learner in the learner list of each course, and one or more reviewer desktops for each course based, at least in part, on the final lab configuration and the additional inputs that are received for the respective course using a virtual machine provisioning and management engine, wherein the learner desktop created for a learner is used as a virtual lab by a respective learner for performing hands on experiments related to a course for which the learner is enrolled, and wherein each reviewer desktop created for a course is used by a reviewer for reviewing work done by each learner on the learner desktop created for the respective course                                        410

FIG. 4B                                   400

METHODS AND SYSTEMS FOR PROVISIONING VIRTUAL LAB WITH LEARNING MANAGEMENT SYSTEM

PRIORITY CLAIM

This U.S. patent application claims priority under 35 U.S.C. § 119 to: Indian patent application Ser. No. 202321021080, filed on Mar. 24, 2023. The entire contents of the aforementioned application are incorporated herein by reference.

TECHNICAL FIELD

The disclosure herein generally relates to virtual learning, and, more particularly, to methods and systems for provisioning virtual lab with a learning management system.

BACKGROUND

Currently, people are more inclined towards virtual learning as it eliminates the need to physically attend the classes. This inclination towards virtual learning started during pandemic due to logistic challenges but now it has become an indispensable part of most of the people, if not all due to the numerous benefits it offers.

However, gaining practical knowledge in virtual learning setup is still a big challenge as many people do not have access to the required material or technology. So, gaining practical knowledge of technologies that require high-end computer system or courses requiring lab kind of a setup is not possible for every student/learner who is consuming content and connecting to teachers virtually through any learning management system (LMS).

Further, learners who need to learn customized software, such as Microsoft Office® or Adobe Photoshop®, or learners who need a high-end machine for their work, such as a high end server, or a high end personal computer to install and run software like SAP®, AutoCAD™ or any simulation software are much more impacted as they simply cannot install complex and heavy packages like AutoCAD™ on their home computers, which leaves them with theoretical knowledge only without knowing how to apply it in real world.

SUMMARY

Embodiments of the present disclosure present technological improvements as solutions to one or more of the above-mentioned technical problems recognized by the inventors in conventional systems. For example, in one aspect, there is provided a processor implemented method for provisioning virtual lab with a learning management system. The method comprises receiving, by a virtual lab provisioning system (VLPS) via one or more hardware processors, course details from a learning management system (LMS), wherein the course details comprise a list of a plurality of courses that are offered by the LMS; determining, by the VLPS via the one or more hardware processors, a virtual lab configuration for each course of the plurality of courses using a smart virtual machine configuration repository, wherein the virtual lab configuration comprises one or more of: a virtual machine requirement, an operating system requirement, a storage requirement, and a list of required software and tools; sending, by the VLPS via the one or more hardware processors, the virtual lab configuration determined for each course as a recommended virtual lab configuration for a respective course to the LMS, wherein the recommended virtual lab configuration for each course is reviewed by an administrator to draft a final lab configuration for the respective course; receiving, by the VLPS via the one or more hardware processors, the final lab configuration for each course of the plurality of courses and one or more additional inputs from the LMS, wherein the one or more additional inputs comprise one or more of: an infrastructure-as-a-service (IaaS) platform details, a learner list for each course, a lab availability details for each learner in the learner list of each course, a cool off period details for each course, a faculty virtual machine details for each course, an automation script for one or more courses of the plurality of courses, a LMS application programming interface details, and an attempt details for each course of the plurality of courses; and creating, by the VLPS via the one or more hardware processors, a learner desktop for each learner in the learner list of each course, and one or more reviewer desktops for each course based, at least in part, on the final lab configuration and the additional inputs that are received for the respective course using a virtual machine provisioning engine, wherein the learner desktop created for a learner is used as a virtual lab by a respective learner for performing hands on experiments related to a course for which the learner is enrolled, and wherein each reviewer desktop created for a course is used by a reviewer for reviewing work done by each learner on the learner desktop created for the respective course.

In another aspect, there is provided a virtual lab provisioning system for provisioning virtual lab with a learning management system. The system comprises a memory storing instructions; one or more communication interfaces; and one or more hardware processors coupled to the memory via the one or more communication interfaces, wherein the one or more hardware processors are configured by the instructions to: receive course details from a learning management system (LMS), wherein the course details comprise a list of a plurality of courses that are offered by the LMS; determine a virtual lab configuration for each course of the plurality of courses using a smart virtual machine configuration repository, wherein the virtual lab configuration comprises one or more of: a virtual machine requirement, an operating system requirement, a storage requirement, and a list of required software and tools; send the virtual lab configuration determined for each course as a recommended virtual lab configuration for a respective course to the LMS, wherein the recommended virtual lab configuration for each course is reviewed by an administrator to draft a final lab configuration for the respective course; receive the final lab configuration for each course of the plurality of courses and one or more additional inputs from the LMS, wherein the one or more additional inputs comprise one or more of: an infrastructure-as-a-service (IaaS) platform details, a learner list for each course, a lab availability details for each learner in the learner list of each course, a cool off period details for each course, a faculty virtual machine details for each course, an automation script for one or more courses of the plurality of courses, a LMS application programming interface details, and an attempt details for each course of the plurality of courses; and create a learner desktop for each learner in the learner list of each course, and one or more reviewer desktops for each course based, at least in part, on the final lab configuration and the additional inputs that are received for the respective course using a virtual machine provisioning engine, wherein the learner desktop created for a learner is used as a virtual lab by a respective learner for performing hands on experiments related to a course for which the learner is enrolled, and wherein each reviewer desktop created for a course is used by a reviewer for reviewing work done by each learner on the learner desktop created for the respective course.

In yet another aspect, there are provided one or more non-transitory machine-readable information storage mediums comprising one or more instructions which when executed by one or more hardware processors cause a method for provisioning virtual lab with a learning management system. The method comprises receiving, by a virtual lab provisioning system (VLPS), course details from a learning management system (LMS), wherein the course details comprise a list of a plurality of courses that are offered by the LMS; determining, by the VLPS, a virtual lab configuration for each course of the plurality of courses using a smart virtual machine configuration repository, wherein the virtual lab configuration comprises one or more of: a virtual machine requirement, an operating system requirement, a storage requirement, and a list of required software and tools; sending, by the VLPS, the virtual lab configuration determined for each course as a recommended virtual lab configuration for a respective course to the LMS, wherein the recommended virtual lab configuration for each course is reviewed by an administrator to draft a final lab configuration for the respective course; receiving, by the VLPS, the final lab configuration for each course of the plurality of courses and one or more additional inputs from the LMS, wherein the one or more additional inputs comprise one or more of: an infrastructure-as-a-service (IaaS) platform details, a learner list for each course, a lab availability details for each learner in the learner list of each course, a cool off period details for each course, a faculty virtual machine details for each course, an automation script for one or more courses of the plurality of courses, a LMS application programming interface details, and an attempt details for each course of the plurality of courses; and creating, by the VLPS, a learner desktop for each learner in the learner list of each course, and one or more reviewer desktops for each course based, at least in part, on the final lab configuration and the additional inputs that are received for the respective course using a virtual machine provisioning engine, wherein the learner desktop created for a learner is used as a virtual lab by a respective learner for performing hands on experiments related to a course for which the learner is enrolled, and wherein each reviewer desktop created for a course is used by a reviewer for reviewing work done by each learner on the learner desktop created for the respective course.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 4A and 4B, collectively, illustrate an exemplary flow diagram of a method for provisioning virtual lab with the learning management system, in accordance with an embodiment of the present disclosure.

DETAILED DESCRIPTION

Figure 1:
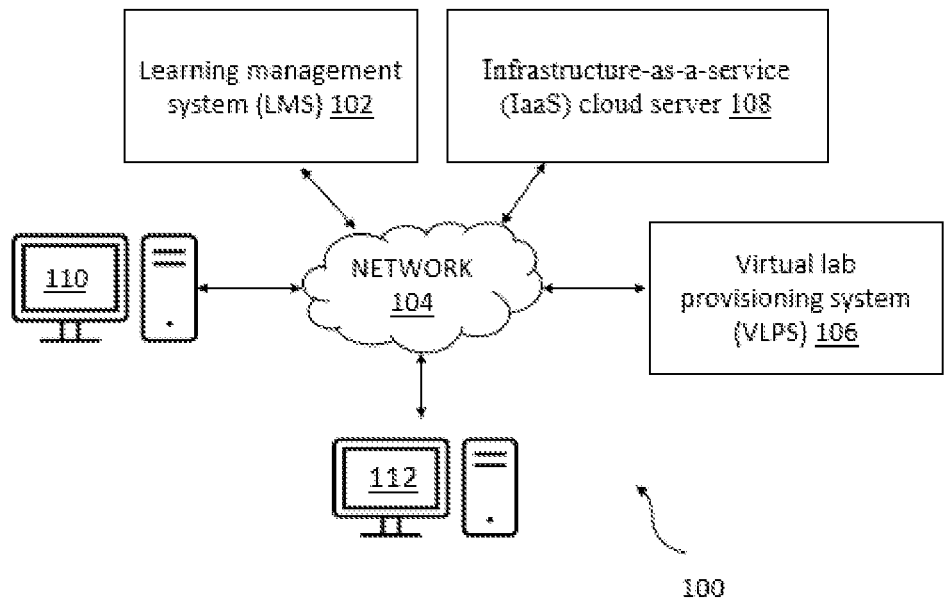
FIG. 1 is an example representation of an environment, related to at least some example embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

With the ongoing pandemic, and even in normal conditions, the inability of people to go to physical computer labs and perform the required learning activity or get a high-end computer system to setup a server to complete a project, prohibits practical hands-on learning that further leaves them with only theoretical knowledge without knowing how to apply it.

As discussed earlier, students/learners who are consuming content and connecting to teachers virtually via learning management systems (LMS) are much more impacted as they cannot install complex and heavy packages required for getting hands on leaning experience on their personal computers as hardware and software configuration of the personal computers are not designed to support such complex and heavy packages.

Some available techniques create web based simulated lab type setups for students/learners in which lab environment is created according to the course of student. However, these techniques require student systems to have some basic setup for working on the virtual labs. Few available techniques also provide cloud-based virtual labs in which a private cloud is created that have access to multiple software labs which can be used during virtual training. But the private cloud created here is used with OpenStack® which is an open-source tool. Further, the available virtual lab techniques don't provide seamless integration with the LMS. Additionally, tracking facility in which the work done by the users on the virtual lab can be tracked, and auto-marking facility where the work done by the users on the virtual lab can be marked are also not available in any of the available virtual lab setups.

So, a technique that can simulate a school lab experience for students or enable learners to perform practical hands-on on various technologies, with various software, and on different machine configurations from their own personal systems while providing seamless integration with the LMS is still to be explored.

Embodiments of the present disclosure overcome the above-mentioned disadvantages by providing methods and systems for provisioning virtual lab with a learning management system. The system of the present disclosure provides a virtual desktop (also referred as learner desktop) that is created on an infrastructure-as-a-service (IaaS) platform. The learner desktop can be accessed by a user/learner from their existing computer system via a LMS account. The virtual desktop may have the hardware configuration and software packages required to solve one or more problems or perform one or more experiments related to a course for which they have enrolled in an LMS.

To create the learner desktop for a learner, the system first receives course details from the LMS. The system then determines a virtual lab configuration for each course based on the course details received for a respective course using a smart virtual machine configuration repository. Thereafter, the system recommends the determined virtual lab configuration for each course to an administrator of the LMS. The administrator can accept or modify the recommended virtual lab configuration of each course to provide a final lab configuration for each course. Along with the final lab configuration for each course, the LMS also shares the additional inputs that are required for creation of the learner desktop.

Once the final lab configuration for each course is available, the system creates a learner desktop for each learner in a learner list of each course. The complete process of creating the learner desktop and provisioning it with the LMS is explained in detail with reference to FIG. 4. The learner desktop is then used as a virtual lab by a respective learner for performing hands on experiments related to a course for which the learner is enrolled.

In the present disclosure, the system and the method intelligently suggest machine configuration for each course, thereby eliminating the need to manually search and suggest lab configurations for each course. The system and the method also provide plug and play kind of desktops that can be created on any available IaaS platform and can be integrated with any available LMS, thereby ensuring seamless integration while facilitating use of already existing functionalities of the LMS which further ensures easy accessibility for the learners. Further, the system allows learners to access the computer system provisioned via a browser to get access to high end machines and complex packages, which help them in gaining real-time experience and learning practical problem-solving skills related to the subject that they are learning. Additionally, the system provides auto-marking facility for work done by the learners on the learner desktops, thereby eliminating the need to perform manual checks which further reduces the time spent by the reviewer in reviewing the work.

Referring now to the drawings, and more particularly to FIGS. 1 through 7, where similar reference characters denote corresponding features consistently throughout the figures, there are shown preferred embodiments and these embodiments are described in the context of the following exemplary system and/or method.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, determining virtual lab configuration, creating learner desktop, etc. The environment 100 generally includes a learning management system (hereinafter referred as 'LMS') 102, a virtual lab provisioning system (hereinafter referred as 'VLPS') 106, an infrastructure-as-a-service (hereinafter referred as 'IaaS') cloud server 108, and one or more electronic devices, such as an electronic device 110 (hereinafter also referred as learner device 110), and an electronic device 112 (hereinafter also referred as reviewer device 112), each coupled to, and in communication with (and/or with access to) a network 104. It should be noted that one learner device and one reviewer device is shown for the sake of explanation; there can be more number of learner and reviewer devices.

The network 104 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 100 may connect to the network 104 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

The learner device 110 is associated with a learner (e.g., a user of an LMS) who has enrolled for learning at least one course in the LMS 102. The reviewer device 112 is associated with a reviewer (e.g., a teacher working with the LMS) who wants to (or may) review the work done by the learners of the at least one course in the LMS 102. Examples of the learner device 110 and the reviewer device 112 include, but are not limited to, a personal computer (PC), a mobile phone, a tablet device, a Personal Digital Assistant (PDA), a server, a voice activated assistant, a smartphone, and a laptop.

In an embodiment, the LMS 102 refers to a software that is designed to specifically create, distribute, and manage the delivery of educational content and track the progress of the student. The LMS 102 can be hosted as a stand-alone product on a server of a company responsible for managing the LMS 102, or it can be a cloud-based platform that is hosted by the company responsible for managing the LMS 102. Examples of the LMS 102 includes, but are not limited to, Moodle®, Canvas™, Blackboard learn™, Schoology®, Sakai™, and Google Classroom®.

In an embodiment, the IaaS refers to a cloud service model that offers on-demand infrastructure resources, such as compute, storage, networking, and virtualization, over the Internet to businesses and individuals via a cloud server, such as the IaaS cloud server 108. In particular, it eliminates the need for enterprises to procure, configure, or manage infrastructure themselves, and they only pay for what they use. Examples of the IaaS cloud server 108 includes, but are not limited to, Amazon elastic compute cloud (EC2), Microsoft Azure™, IBM's™ blue cloud, sun cloud, and Google™ cloud.

The virtual lab provisioning system (hereinafter referred as 'VLPS') 106 includes one or more hardware processors and a memory. The VLPS 106 is first configured to receive course details of a course via the network 104 from the LMS 102. The VLPS 106 then intelligently determines virtual lab configuration for the course. The virtual lab configuration is then shared as the recommendation with an administrator of the LMS 102. The administrator of the LMS 102 may accept or edit the recommendation to provide the final lab configuration for the course to the VLPS 106. The LMS 102 also shares additional inputs along with the final lab configuration with the VLPS 106. The additional inputs include one or more of an infrastructure-as-a-service (IaaS) platform details, such as details of the IaaS cloud server 108, a learner list for the course, a lab availability details for each learner in the learner list of the course, a cool off period details for the course, a faculty virtual machine details for the course, an automation script if any for the course, a LMS application programming interface details, and an attempt details for the course.

The VLPS 106 is then configured to create and provision learner desktop/virtual lab on the desired IaaS provider, such as the IaaS cloud server 108, with the final lab configuration, such as hardware configuration, region, software packages, and many other customization and automation options provided by the LMS 102 in form of the additional inputs. The learner may use the learner device 110 to access the virtual lab provisioned via a browser using the network 104 to get access to high end machines, complex packages, which helps him/her to experience and learn practical problem solving related to the at least one course for which he has enrolled in the LMS 102.

Similarly, the VLPS 106 creates and provisions a reviewer desktop for the course based, at least in part, on the final lab configuration and the additional inputs that are received for the respective course. The reviewer may use the reviewer device 112 to access the reviewer desktop via the browser using the network 104 for reviewing the work done by the learner on the created learner desktop/virtual lab. The process of creating and provisioning learner desktop and reviewer is explained in detail with reference to FIG. 4.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100 (e.g., refer scenarios described above).

Figure 2:
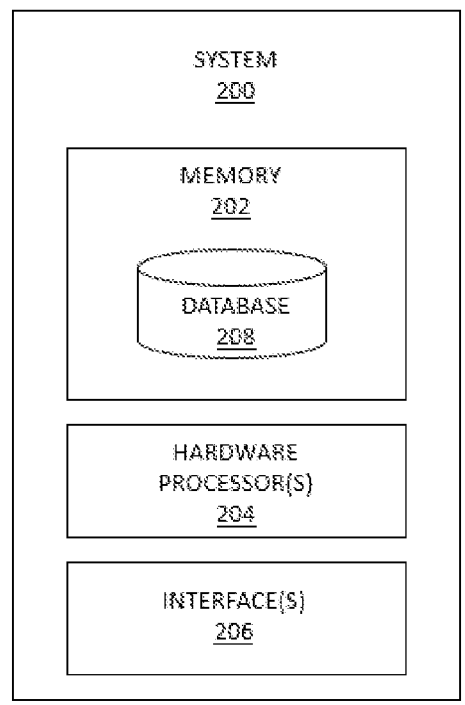
FIG. 2 illustrates an exemplary block diagram of a system for provisioning virtual lab with a learning management system, in accordance with an embodiment of the present disclosure.

FIG. 2 illustrates an exemplary block diagram of a virtual lab provisioning system 200 for provisioning virtual lab with a learning management system, such as the LMS 102 in accordance with an embodiment of the present disclosure. In an embodiment, the virtual lab provisioning system 200 may also be referred as system 200 and may be interchangeably used herein. The virtual lab provisioning system 200 is similar to the VLPS 106 explained with reference to FIG. 1. In some embodiments, the system 200 is embodied as a cloud-based and/or SaaS-based (software as a service) architecture. In some embodiments, the system 200 may be implemented in a server system. In some embodiments, the system 200 may be implemented in a variety of computing systems, such as laptop computers, notebooks, hand-held devices, workstations, mainframe computers, and the like.

In an embodiment, the system 200 includes one or more processors 204, communication interface device(s) or input/output (I/O) interface(s) 206, and one or more data storage devices or memory 202 operatively coupled to the one or more processors 204. The one or more processors 204 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 200 can be implemented in a variety of computing systems, such as laptop computers, notebooks, hand-held devices, workstations, mainframe computers, servers, a network cloud and the like.

The I/O interface device(s) 206 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 208 can be stored in the memory 202, wherein the database 208 may comprise, but are not limited to, a smart virtual machine configuration repository, a list of a plurality of courses, a final lab configuration for each course, and the like. The memory 202 further comprises (or may further comprise) information pertaining to input(s)/output(s) of each step performed by the systems and methods of the present disclosure. In other words, input(s) fed at each step and output(s) generated at each step are comprised in the memory 202 and can be utilized in further processing and analysis.

It is noted that the system 200 as illustrated and hereinafter described is merely illustrative of an apparatus that could benefit from embodiments of the present disclosure and, therefore, should not be taken to limit the scope of the present disclosure. It is noted that the system 200 may include fewer or more components than those depicted in FIG. 2.

Figure 3:
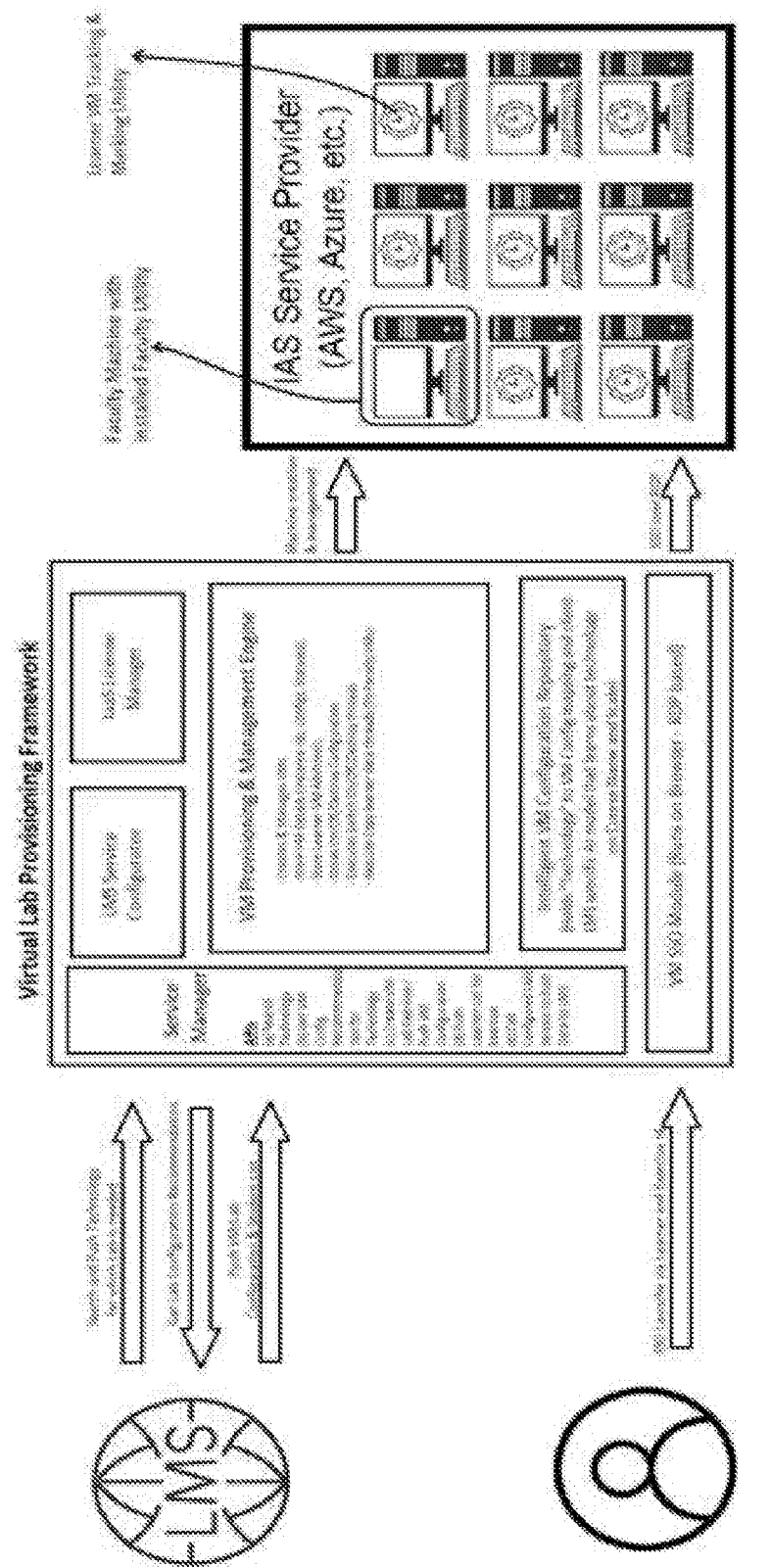
FIG. 3 illustrates a schematic block diagram representation of a virtual lab provisioning system for provisioning virtual lab with a learning management system, in accordance with an embodiment of the present disclosure.
Figure 5:
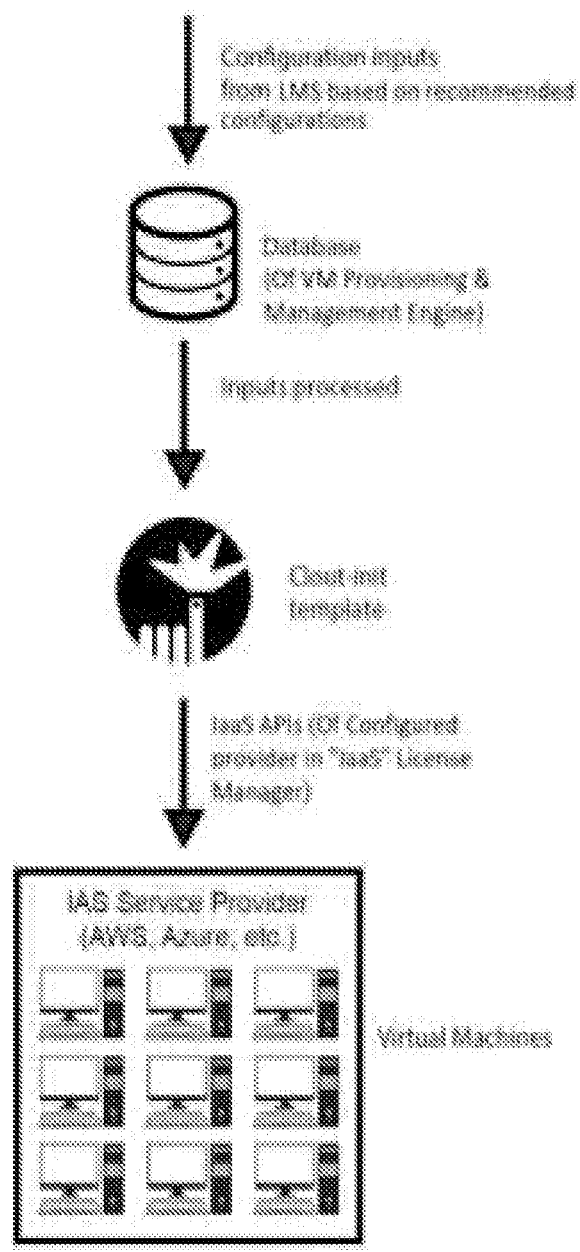
FIG. 5 illustrates a schematic representation of a virtual desktop creation process, in accordance with an embodiment of the present disclosure.
Figure 6:
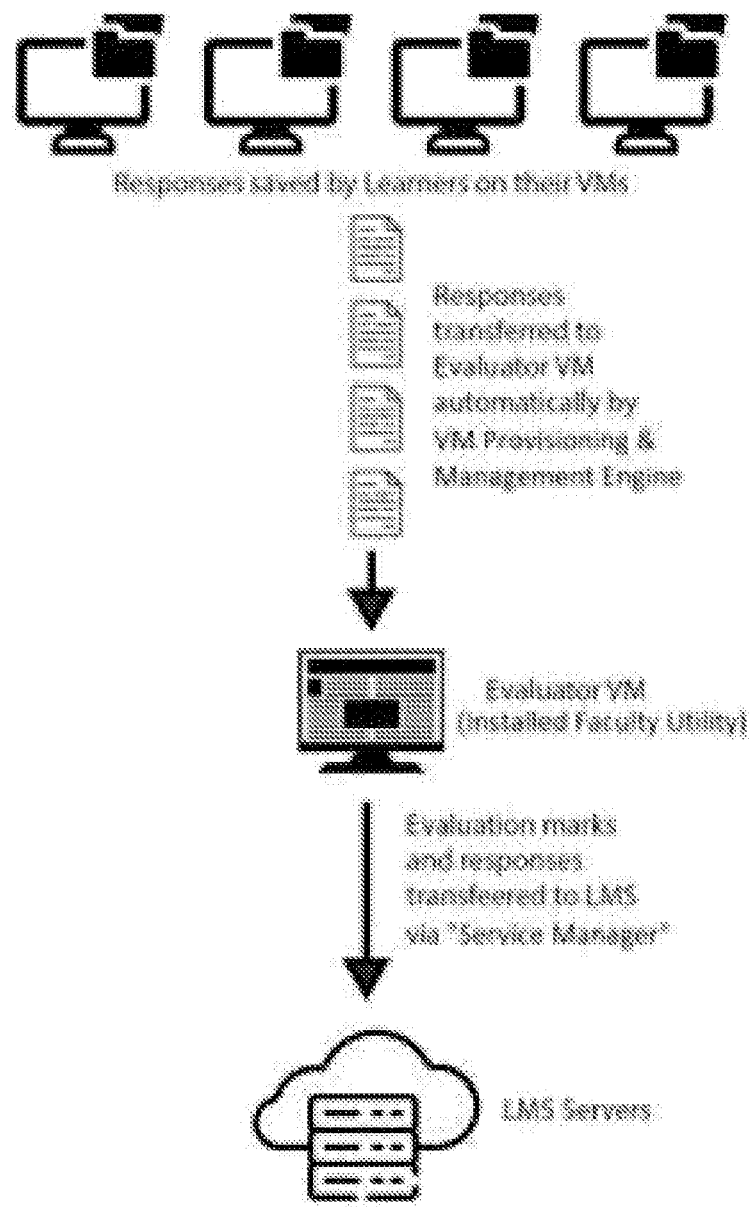
FIG. 6 illustrates a schematic representation of a copying process for copying learner data to reviewer desktops, in accordance with an embodiment of the present disclosure.

FIG. 3, with reference to FIGS. 1-2, illustrates a schematic block diagram representation 300 of the virtual lab provisioning system 200 (interchangeably referred as 'virtual lab provisioning framework') of FIG. 2 or the VLPS 106 of FIG. 1 for provisioning of virtual lab with the learning management system, in accordance with an embodiment of the present disclosure.

In an embodiment, the virtual lab provisioning framework is a cloud hosted, service-based framework which, when integrated, allow any LMS, such as the LMS 102 to use at least one IaaS provider to manage their virtual lab requirements for complex technologies/subjects.

As seen in FIG. 3, the LMS shares a course type or a technology for which virtual lab is required with the virtual lab provisioning framework. A service manager component present in the virtual lab provisioning framework receives the course type or the technology as it acts as an overall interface to interact with the framework and the LMS.

Thereafter, an intelligent virtual machine configuration repository component present in the virtual lab provisioning framework determines virtual lab configuration for the received course type or the technology. The determined virtual lab configuration is then shared with the LMS and the LMS administrator may review to accept or edit the recommended lab configuration and then pushes a final lab configuration back to the framework along with one or more additional inputs. In particular, the service manager component receives the input via a "Push VM Configuration" application programming interface (API) and a "Push Learner List" API. The one or more additional inputs includes one or more of an infrastructure-as-a-service (IaaS) platform details, a learner list for the course, a lab availability details for each learner in the learner list of the course, a cool off period details for the course, a faculty virtual machine details for the course, an automation script for the course of any, a LMS application programming interface details, and an attempt details for the course and the like.

An IaaS license manager component present in the virtual lab provisioning framework then stores IaaS provider details and their API keys that are received in form of the IaaS platform details. In particular, it stores AWS, or Azure or Google Cloud details.

Further, a virtual machine provisioning and management engine present in the virtual lab provisioning framework creates and manages virtual desktops (e.g., learner desktops/machines and reviewer desktops/machines) based on the final lab configuration, the IaaS provider details stored in the IaaS license manager component and the other additional inputs that are received.

The virtual machine provisioning and management engine is also configured to create standard file and folder structure on all the created virtual desktops to allow learners and reviewers to save their responses in their corresponding folders. Additionally, the virtual machine provisioning and management engine stores virtual desktop details, such as instance ids, configs, statuses, learner-virtual desktop allotment, on/off/destroy configuration details of virtual desktops and executes threads to switch on/off/destroy virtual desktops.

In at least one example embodiment, the created reviewer desktop includes a faculty utility that helps in fetching learner list for the current exercise for the reviewer as a Microsoft excel spreadsheet™, and also pushes artifacts and marks to the LMS via the service manager component. Similarly, the created learner desktop includes a virtual machine tracking and marking utility that helps in tracking learner time and Internet access. The virtual machine tracking and marking utility also helps in auto-evaluating the learner work in case the automation script is received for the course.

Once the virtual machines are created, a virtual machine single sign-on (SSO) module of the virtual lab provisioning framework provide access of the created virtual desktops to the learners of the course using a remote desktop protocol.

In an embodiment, the virtual machine provisioning and management engine is also configured to run threads to copy learner data i.e., work done by the learners on their learner desktops from the learner desktops to the reviewer desktops so that reviewers get to see how learners have performed in an exercise.

FIGS. 4A and 4B, with reference to FIGS. 1 through 3, collectively, represent an exemplary flow diagram of a method 400 for provisioning virtual lab with the learning management system, in accordance with an embodiment of the present disclosure. The method 400 may use the system 200 of FIG. 2 and VLPS 106 of FIG. 1 for execution. In an embodiment, the system 200 comprises one or more data storage devices or the memory 202 operatively coupled to the one or more hardware processors 204 and is configured to store instructions for execution of steps of the method 400 by the one or more hardware processors 204. The sequence of steps of the flow diagram may not be necessarily executed in the same order as they are presented. Further, one or more steps may be grouped together and performed in form of a single step, or one step may have several sub-steps that may be performed in parallel or in sequential manner. The steps of the method of the present disclosure will now be explained with reference to the components of the system 200 as depicted in FIG. 2, and the VLPS 106 of FIG. 1.

At step 402 of the method of the present disclosure, the one or more hardware processors 204 of the system 200 receive course details from an LMS, such as the LMS 102. The course details include a list of a plurality of courses that are offered by the LMS. The plurality of courses can be technical courses or scientific courses.

At step 404 of the method of the present disclosure, the one or more hardware processors 204 of the system 200 determine a virtual lab configuration for each course of the plurality of courses using the intelligent virtual machine configuration repository. In at least one example embodiment, the intelligent virtual machine configuration repository is an artificial intelligence-based configuration repository that is configured to store recommended virtual machine configurations against a list of subjects/technologies. For example, if a course passed is 'Beginner AI-ML via Python', then the intelligent virtual machine configuration repository intelligently suggests below machine recommendations for learner desktop:

Instance Type: t3a.medium, 4 core CPU, 4 GB RAM
OS: Ubuntu 18.04
Concurrent Learners logging on to Desktop: 4
Packages Available to Learner: {python3, setuptools, pyopenssl, pip3, tzdata, numpy, scipy, nose, h5py, matplotlib, pandas, sympy, ipython, Cython, ipykernel, grpcio, tensorflow, scikit-build, opencv-python, keras, gensim, scikit-learn, scikit-image, spacy, tesseract-ocr-all, pytesseract, nvidia-cuda-toolkit, python3-seaborn, PyQtWebEngine, spyder3, pycharm-community, jupyter-notebook}

In particular, for each course, the intelligent virtual machine configuration repository suggests what type of virtual lab is required for learners to perform their tasks i.e., what can be an ideal machine requirement in terms of central processing unit (CPU), memory and operating system, along with information of software tools/applications that may be required for learning practical applications of the respective course.

At step 406 of the method of the present disclosure, the one or more hardware processors 204 of the system 200 send the virtual lab configuration determined for each course as a recommended virtual lab configuration for a respective course to the LMS. The determined virtual lab configuration of each course is sent back to the LMS which is then reviewed by an administrator/user of the LMS to draft a final lab configuration for the respective course.

For example, if the administrator/user of the LMS feels that the recommended virtual lab configuration for any course is not the preferred configuration for the same course, the administrator/user may edit or make changes in the recommended virtual lab configuration to provide the final lab configuration for the respective course. In an embodiment, the final lab configuration for a course is the virtual machine configuration that will be used for creation of virtual desktops for the learners of that course.

In an embodiment, the intelligent virtual machine configuration repository is also configured to continually learn based on activities performed in the LMS to create a LMS specific configuration repository. The LMS specific configuration repository provides a LMS specific virtual lab configuration recommendation for each course.

As explained in the previous example, the administrator/user can edit or make changes in the recommended virtual lab configuration, so the intelligent virtual machine configuration repository is also configured to learn from all these changes that are made by the users to come up with lab configurations that are designed as per the requirement of the LMS i.e., it creates the LMS specific virtual lab configuration recommendation for each course so that better recommendations can be provided in future for newly added courses in the LMS.

At step 408 of the method of the present disclosure, the one or more hardware processors 204 of the system 200 receive the final lab configuration for each course of the plurality of courses and one or more additional inputs from the LMS. The one or more additional inputs include one or more of: an infrastructure-as-a-service (IaaS) platform details, a learner list for each course, a lab availability details for each learner in the learner list of each course, a cool off period details for each course, a faculty virtual machine details for each course, an automation script for one or more courses of the plurality of courses, a LMS application programming interface details, and an attempt details for each course of the plurality of courses. In an embodiment, the attempt details include minimum passing marks required, and number of attempts allowed for clearing an exercise.

At step 410 of the method of the present disclosure, the one or more hardware processors 204 of the system 200 create a learner desktop for each learner in the learner list of each course, and one or more reviewer desktops for each course based, at least in part, on the final lab configuration and the additional inputs that are received for the respective course using the virtual machine provisioning and management engine. The learner desktop created for a learner is used as a virtual lab by a respective learner for performing hands on experiments related to a course for which the learner is enrolled. Similarly, each reviewer desktop created for a course is used by a reviewer of that course for reviewing work done by each learner on the learner desktop created for the respective course. The process of creating learner desktop for each learner in the learner list of each course, and one or more reviewer desktops for each course using the virtual machine provisioning and management engine is explained in detail below.

The virtual machine provisioning and management engine first creates a customized template for each course based on the operating system requirement of the respective course. In an embodiment, a cloud-init template is used for creation of the customized template for each course. Then, the virtual machine provisioning and management engine calculates a required number of learner desktops to be created for each course based on the learner list received for the respective course using a predefined desktop creation formula mentioned below.

Number of desktops to be provisioned=(Total no. of Learners)/(User concurrency)

It should be noted that user concurrency is also taken in consideration while calculating number of desktops as a plurality of learners can share the same machine and perform their tasks simultaneously, thereby reducing the learner desktop requirement which ultimately leads to reduction in cost.

Thereafter, the virtual machine provisioning and management engine determines a number of reviewer desktops required for each course based on the faculty virtual machine details for the respective course that are received along with the additional inputs. Then, a plurality of learner accounts are created for each course based on the calculated number of the learner desktops, and one or more reviewer accounts are created based on the determined number of the reviewer desktops using the customized template created for the respective course. It should be noted that a random password is also set by the virtual machine provisioning and management engine for each of the created learner as well as the reviewer account.

Once the learner and reviewer accounts are created, the virtual machine provisioning and management engine installs one or more course specific software applications on the plurality of learner accounts and on the one or more reviewer accounts created for each course based on the list of required software of the respective course using the customized template. In particular, one or more software packages that are selected during final lab configuration are installed with the help of cloud-init template. Then, the virtual machine provisioning and management engine creates one or more files and folder structure in each of the plurality of learner accounts, and each of the one or more reviewer accounts. In an embodiment, along with the files and folder structure, instruction file and some other files are also created in order to assist learners and reviewers to use their virtual desktops.

Finally, the virtual machine provisioning and management engine creates the learner desktop for each learner in the learner list of each course based on the learner account of the respective learner, and a reviewer desktop for each reviewer of each course based on the reviewer account of the respective reviewer using one or more application programming interfaces (APIs) offered by an infrastructure-as-a-service platform provided in the IaaS platform details, and the customized template and the final lab configuration of the respective course. Each of the learner desktop and the reviewer desktop includes a unique desktop identification (ID). The desktop creation process is depicted with help of FIG. 5.

In particular, once all the data that is received from the LMS is processed and the cloud-init template is created, the virtual desktops i.e., the learner desktops and the reviewer desktops are created with the help of the prepared cloud-in it template and other parameters defined during configuration such as the hardware configuration required, amount of storage required, etc. It should be noted that the virtual machine provisioning and management engine use APIs offered by the IaaS platform to pass all the data to the IaaS platform so that the virtual desktops can be created.

Once the learner desktop is created for each learner in the learner list of each course, the created desktops are mapped to the respective learner using the unique desktop identification. The mapping is done so that when a specific learner tries to access the learner desktop, they get access of same learner desktop where they have worked earlier and can find all their saved work on that desktop.

After the mapping is done, the learner desktop mapped to each learner in the learner list of each course is associated with a LMS account of the respective learner in the LMS so that the learner desktop become part of a normal flow of the LMS for the learner. In particular, the LMS APIs configured in the LMS service configurator component, and framework APIs exposed by the service manager component, are provided to the LMS so that the LMS allows either learning or assessment lab activities by linking some question text or some examination parameters, such as start time, end time etc., and calls system APIs for configuring the same. Also, the LMS is integrated with the virtual machine single sign-on module so that the learners can go to the system 200, launch the learner desktops, do the required activity, and leave their work on the machines in required folders to be evaluated. The system 200 can also provide a timer on the learner desktop if required and close the activity after a stipulated time.

In an embodiment, the system 200 is configured to track one or more learning activities that are performed on the learner desktop by each learner in the learner list of each course. The system is also configured to perform one or more actions on the learner desktop of each learner in the learner list of each course based on the tracked one or more learning activities of the respective learner and the one or more additional inputs that are received for a course for which the respective learner is enrolled. The one or more actions include one or more of stopping access of learner desktop beyond allowed duration, controlling internet access on the learner desktop, controlling permissions of learner account on the learner desktop, and monitoring files created by the learner on the learner desktop.

At least in one example embodiment, the system 200 is configured to access automation script information from the received additional inputs. The automation script information includes a list of automation script courses for which the automation script is received. Thereafter, for each course in the list of automation script courses, the system 200 perform auto-marking of the learner data (i.e., the work done by the learner on the learner desktop) of each leaner of the respective course based on the automation script received for the same course to generate an evaluation report for each learner. The learner data and the evaluation report generated for each leaner is then sent to the LMS account of the respective learner in the LMS using LMS APIs included in the LMS application programming interface details.

Additionally, for each course of the one or more courses that are not included in the list of automation script courses, the system 200 accesses a list of learners of the respective course who attempted a hands-on exercise on the learner desktop. Once the list of learners is available, the system 200 copies the learner data created by each leaner in the list of learners to at least one reviewer desktop of the one or more reviewer desktops that are created for the respective course. It should be noted that the learner data associated with each learner is copied in a defined folder created in the at least one reviewer desktop. In particular, in case the automation script is not provided by the LMS as an input for any course, then evaluation can be carried out manually by an assigned faculty (or reviewer), who gets access to a reviewer desktop with the same configuration as that of the learner desktop that are created for the learners of that particular course. The flow of copying of learner data to reviewer desktop is depicted with help of FIG. 6.

Figure 7:
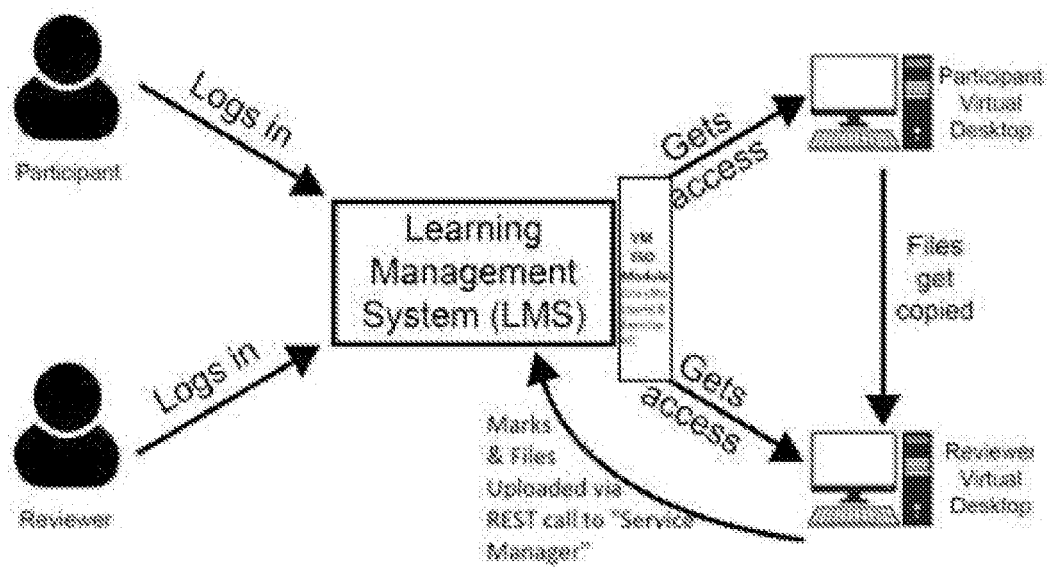
FIG. 7 illustrates a schematic representation of an access flow of virtual desktops created by the system of FIG. 2 or the VLPS of FIG. 1, in accordance with an embodiment of the present disclosure.

FIG. 7, with reference to FIGS. 1 to 6, illustrates a schematic representation depicting access flow of virtual desktops created by the system 200 of FIG. 2 or the VLPS 106 of FIG. 1, in accordance with an embodiment of the present disclosure.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

As discussed earlier, setting up a server at home computer to complete a project or installing a lab software at home computer for performing lab experiments is not possible due to the various limitation of the home computer, such as cost, hardware and software configurations etc., which prohibits practical hands-on learning for learners. Available techniques require student systems to have some basic setup for working on the virtual labs So, to overcome the disadvantages, embodiments of the present disclosure provide methods and systems for provisioning virtual lab with the learning management system. More specifically, the system and the method intelligently suggest machine configuration for each course, thereby eliminating the need to manually search and suggest lab configurations for each course. The system and the method also provide plug and play kind of desktops that can be created on any available IaaS platform and can be integrated with any available LMS, thereby ensuring seamless integration while facilitating use of already existing functionalities of the LMS which further ensures easy accessibility for the learners. Further, the system allows learners to access the computer system provisioned via a browser to get access to high end machines and complex packages, which help them in gaining real-time experience and learning practical problem-solving skills related to the subject that they are learning. Additionally, the system provides auto-marking facility for work done by the learners on the learner desktops, thereby eliminating the need to perform manual checks which further reduces the time spent by the reviewer in reviewing the work.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
   receiving, by a virtual lab provisioning system (VLPS) via one or more hardware processors, course details from a learning management system (LMS), wherein the course details comprise a list of a plurality of courses that are offered by the LMS;
   determining, by the VLPS via the one or more hardware processors, a virtual lab configuration for each course of the plurality of courses using an intelligent virtual machine configuration repository, wherein the virtual lab configuration comprises one or more of: a virtual machine requirement, an operating system requirement, a storage requirement, and a list of required software and tools;
   sending, by the VLPS via the one or more hardware processors, the virtual lab configuration determined for each course as a recommended virtual lab configuration for a respective course to the LMS, wherein the recommended virtual lab configuration for each course is reviewed to accept or modify the recommended virtual lab configuration by an administrator to draft a final lab configuration for the respective course, wherein the intelligent virtual machine configuration repository is an artificial intelligence-based configuration repository that is configured to continually learn based on activities performed including modifications or changes to the recommended virtual lab configuration by the administrator in the LMS to create a LMS specific configuration repository, and wherein the LMS specific configuration repository provides a LMS specific virtual lab configuration recommendation for each course and for newly added courses in the LMS in future,
   wherein the intelligent virtual machine configuration repository is configured to store recommended virtual lab configurations against a list of subjects or technologies, wherein for each course, the intelligent virtual machine configuration repository suggests a type of virtual lab that is required for learners to perform tasks including an ideal machine requirement in terms of central processing unit (CPU), memory and operating system, along with information of software tools or applications required for learning practical applications of the respective course;
   receiving, by the VLPS via the one or more hardware processors, the final lab configuration for each course of the plurality of courses and one or more additional inputs from the LMS, wherein the one or more additional inputs comprise one or more of: an infrastructure-as-a-service (IaaS) platform details, a learner list for each course, a lab availability details for each learner in the learner list of each course, a cool off period details for each course, a faculty virtual machine details for each course, an automation script for one or more courses of the plurality of courses, a LMS application programming interface details, and an attempt details for each course of the plurality of courses, wherein the LMS pushes the final lab configuration for each course to a service manager component of the VLPS via a push VM configuration application programming interfaces (API) and a push learner list API; and
   creating, by the VLPS via the one or more hardware processors, a learner desktop for each learner in the learner list of each course, and one or more reviewer desktops for each course based, at least in part, on the final lab configuration and the additional inputs that are received for the respective course using a virtual machine provisioning and management engine, wherein the learner desktop created for a learner is used as a virtual lab by a respective learner for performing hands on experiments related to a course for which the learner is enrolled, and wherein each reviewer desktop created for a course is used by a reviewer for reviewing work done by each learner on the learner desktop created for the respective course,
   wherein the processor implemented method provides plug and play desktops that are created on any available IaaS platform and integrated with any available LMS, ensuring integration while facilitating use of already existing functionalities of the LMS which further ensures easy accessibility for the learners.

2. The processor implemented method of claim 1, wherein the step of creating the learner desktop for each learner in the learner list of each course and the one or more reviewer desktops for each course based, at least in part, on the final lab configuration and the additional inputs that are received for the respective course using the virtual machine provisioning and management engine comprises:

creating, by the VLPS via the one or more hardware processors, a customized template for each course based on the operating system requirement of the respective course;

calculating, by the VLPS via the one or more hardware processors, a required number of learner desktops to be created for each course based on the learner list received for the respective course using a predefined desktop creation formula, wherein user concurrency is considered while calculating the number of learner desktops as a plurality of learners share same machine and perform their tasks simultaneously thereby reducing a learner desktop requirement;

determining, by the VLPS via the one or more hardware processors, a number of reviewer desktops required for each course based on the received faculty virtual machine details for the respective course;

creating, by the VLPS via the one or more hardware processors, a plurality of learner accounts for each course based on the calculated number of the learner desktops, and one or more reviewer accounts based on the determined number of the reviewer desktops using the customized template created for the respective course, wherein a random password is set by the virtual machine provisioning and management engine for each of the created learner account and the reviewer account;

installing, by the VLPS via the one or more hardware processors, one or more course specific software applications on the plurality of learner accounts and on the one or more reviewer accounts created for each course based on the list of required software of the respective course using the customized template;

creating, by the VLPS via the one or more hardware processors, one or more files and folder structure in each of the plurality of learner accounts, and each of the one or more reviewer accounts; and creating, by the VLPS via the one or more hardware processors, the learner desktop for each learner in the learner list of each course based on the learner account of the respective learner, and a reviewer desktop for each reviewer of each course based on the reviewer account of the respective reviewer using one or more application programming interfaces (APIs) offered by an infrastructure-as-a-service platform provided in the IaaS platform details, and the customized template and the final lab configuration of the respective course, wherein each of the learner desktop and the reviewer desktop comprises a unique desktop identification (ID), and wherein learners access the learner desktop provisioned via a browser to get access to high end machines and complex packages, which enables the learners in gaining real-time experience and learning practical problem-solving skills related to a subject the learners are learning.

3. The processor implemented method of claim 2, further comprising:

mapping, by the VLPS via the one or more hardware processors, the learner desktop created for each learner in the learner list of each course to the respective learner using the unique desktop identification, wherein by mapping, a specific learner get access of same learner desktop where the specific learner worked earlier and find all the saved work on the same learner desktop when the specific learner tries to access the learner desktop.

4. The processor implemented method of claim 3, further comprising:

associating, by the VLPS via the one or more hardware processors, the learner desktop mapped to each learner in the learner list of each course with a LMS account of the respective learner in the LMS, wherein the association of the learner desktop of the learner with the LMS account of the respective learner enables the learner account to become part of a normal flow of the LMS; and tracking, by the VLPS via the one or more hardware processors, one or more learning activities performed on the learner desktop by each learner in the learner list of each course.

5. The processor implemented method of claim 4, wherein the step of tracking, by the VLPS via the one or more hardware processors, the one or more learning activities performed on the learner desktop by each learner in the learner list of each course is succeeded by:

performing, by the VLPS via the one or more hardware processors, one or more actions on the learner desktop of each learner in the learner list of each course based on the tracked one or more learning activities of the respective learner and the one or more additional inputs that are received for a course for which the respective learner is enrolled, wherein the one or more actions comprise one or more of: stopping access of learner desktop beyond allowed duration, controlling internet access on the learner desktop, controlling permissions of learner account on the learner desktop, and monitoring files created by the learner on the learner desktop.

6. The processor implemented method of claim 5, further comprising:

for each course of the one or more courses that are not included in the list of automation script courses, perform:

accessing, by the VLPS via the one or more hardware processors, a list of learners of the respective course who attempted a hands-on exercise on the learner desktop; and for each learner in the list of learners, perform:

copying, by the VLPS via the one or more hardware processors, the learner data created by the respective leaner to at least one reviewer desktop of the one or more reviewer desktops created for the respective course, wherein the learner data associated with each learner is copied in a defined folder created in the at least one reviewer desktop.

7. The processor implemented method of claim 1, further comprising:

accessing, by the VLPS via the one or more hardware processors, automation script information from the received additional inputs, wherein the automation script information comprises a list of automation script courses for which the automation script is received; and for each course in the list of automation script courses, performing:

auto-marking, by the VLPS via the one or more hardware processors, learner data of each leaner of the respective course based on the automation script received for the same course to generate an evaluation report for each learner, wherein the learner data comprise work done by the learner on the learner desktop; and sending, by the VLPS via the one or more hardware processors, the learner data and the evaluation report generated for each leaner to the LMS account of the respective learner in the LMS using LMS application programming interfaces included in the LMS application programming interface details.

8. A virtual lab provisioning system, comprising:
a memory storing instructions;
one or more communication interfaces; and
one or more hardware processors coupled to the memory via the one or more communication interfaces, wherein the one or more hardware processors are configured by the instructions to:

receive course details from a learning management system (LMS), wherein the course details comprise a list of a plurality of courses that are offered by the LMS;

determine a virtual lab configuration for each course of the plurality of courses using an intelligent virtual machine configuration repository, wherein the virtual lab configuration comprises one or more of: a virtual machine requirement, an operating system requirement, a storage requirement, and a list of required software and tools;

send the virtual lab configuration determined for each course as a recommended virtual lab configuration for a respective course to the LMS, wherein the recommended virtual lab configuration for each course is reviewed to accept or modify the recommended virtual lab configuration by an administrator to draft a final lab configuration for the respective course, wherein the intelligent virtual machine configuration repository is an artificial intelligence-based configuration repository that is configured to continually learn based on activities performed including modifications or changes to the recommended virtual lab configuration by the administrator in the LMS to create a LMS specific configuration repository, and wherein the LMS specific configuration repository provides a LMS specific virtual lab configuration recommendation for each course and for newly added courses in the LMS in future, wherein the intelligent virtual machine configuration repository is configured to store recommended virtual lab configurations against a list of subjects or technologies, wherein for each course, the intelligent virtual machine configuration repository suggests a type of virtual lab that is required for learners to perform tasks including an ideal machine requirement in terms of central processing unit (CPU), memory and operating system, along with information of software tools or applications required for learning practical applications of the respective course;

receive the final lab configuration for each course of the plurality of courses and one or more additional inputs from the LMS, wherein the one or more additional inputs comprise one or more of: an infrastructure-as-a-service (IaaS) platform details, a learner list for each course, a lab availability details for each learner in the learner list of each course, a cool off period details for each course, a faculty virtual machine details for each course, an automation script for one or more courses of the plurality of courses, a LMS application programming interface details, and an attempt details for each course of the plurality of courses, wherein the LMS pushes the final lab configuration for each course to a service manager component of the VLPS via a push VM configuration application programming interfaces (API) and a push learner list API; and create a learner desktop for each learner in the learner list of each course, and one or more reviewer desktops for each course based, at least in part, on the final lab configuration and the additional inputs that are received for the respective course using a virtual machine provisioning and management engine, wherein the learner desktop created for a learner is used as a virtual lab by a respective learner for performing hands on experiments related to a course for which the learner is enrolled, and wherein each reviewer desktop created for a course is used by a reviewer for reviewing work done by each learner on the learner desktop created for the respective course, wherein the virtual lab provisioning system provides plug and play desktops that are created on any available IaaS platform and integrated with any available LMS, ensuring integration while facilitating use of already existing functionalities of the LMS which further ensures easy accessibility for the learners.

9. The system of claim 8, wherein for creating the learner desktop for each learner in the learner list of each course and the one or more reviewer desktops for each course based, at least in part, on the final lab configuration and the additional inputs that are received for the respective course using the virtual machine provisioning and management engine, the one or more hardware processors are further configured by the instructions to:

create a customized template for each course based on the operating system requirement of the respective course;

calculate a required number of learner desktops to be created for each course based on the learner list received for the respective course using a predefined desktop creation formula;

determine a number of reviewer desktops required for each course based on the received faculty virtual machine details for the respective course;

create a plurality of learner accounts for each course based on the calculated number of the learner desktops, and one or more reviewer accounts based on the determined number of the reviewer desktops using the customized template created for the respective course;

install one or more course specific software applications on the plurality of learner accounts and on the one or more reviewer accounts created for each course based on the list of required software of the respective course using the customized template;

create one or more files and folder structure in each of the plurality of learner accounts, and each of the one or more reviewer accounts; and create the learner desktop for each learner in the learner list of each course based on the learner account of the respective learner, and a reviewer desktop for each reviewer of each course based on the reviewer account of the respective reviewer using one or more application programming interfaces (APIs) offered by an infrastructure-as-a-service platform provided in the IaaS platform details, and the customized template and the final lab configuration of the respective course, wherein each of the learner desktop and the reviewer desktop comprises a unique desktop identification (ID).

10. The system of claim 9, wherein the one or more hardware processors are further configured by the instructions to:
map the learner desktop created for each learner in the learner list of each course to the respective learner using the unique desktop identification.

11. The system of claim 10, wherein the one or more hardware processors are further configured by the instructions to:
associate the learner desktop mapped to each learner in the learner list of each course with a LMS account of the respective learner in the LMS, wherein the association of the learner desktop of the learner with the LMS account of the respective learner enables the learner account to become part of a normal flow of the LMS; and
track one or more learning activities performed on the learner desktop by each learner in the learner list of each course.

12. The system of claim 11, wherein for tracking the one or more learning activities performed on the learner desktop by each learner in the learner list of each course, the one or more hardware processors are further configured by the instructions to:
perform one or more actions on the learner desktop of each learner in the learner list of each course based on the tracked one or more learning activities of the respective learner and the one or more additional inputs that are received for a course for which the respective learner is enrolled, wherein the one or more actions comprise one or more of: stopping access of learner desktop beyond allowed duration, controlling internet access on the learner desktop, controlling permissions of learner account on the learner desktop, and monitoring files created by the learner on the learner desktop.

13. The system of claim 8, wherein the one or more hardware processors are configured by the instructions to:
access automation script information from the received additional inputs, wherein the automation script information comprises a list of automation script courses for which the automation script is received;
for each course in the list of automation script courses, perform:
auto-mark learner data of each leaner of the respective course based on the automation script received for the same course to generate an evaluation report for each learner, wherein the learner data comprise work done by the learner on the learner desktop; and
send the learner data and the evaluation report generated for each leaner to the LMS account of the respective learner in the LMS using LMS application programming interfaces included in the LMS application programming interface details.

14. The system of claim 13, wherein the one or more hardware processors are configured by the instructions to:
for each course of the one or more courses that are not included in the list of automation script courses, perform:
access a list of learners of the respective course who attempted a hands-on exercise on the learner desktop; and
for each learner in the list of learners, perform:
copy the learner data created by the respective leaner to at least one reviewer desktop of the one or more reviewer desktops created for the respective course, wherein the learner data associated with each learner is copied in a defined folder created in the at least one reviewer desktop.

15. One or more non-transitory machine-readable information storage mediums comprising one or more instructions which when executed by one or more hardware processors cause:
receiving, by a virtual lab provisioning system (VLPS), course details from a learning management system (LMS), wherein the course details comprise a list of a plurality of courses that are offered by the LMS;
determining, by the VLPS, a virtual lab configuration for each course of the plurality of courses using an intelligent virtual machine configuration repository, wherein the virtual lab configuration comprises one or more of: a virtual machine requirement, an operating system requirement, a storage requirement, and a list of required software and tools;
sending, by the VLPS, the virtual lab configuration determined for each course as a recommended virtual lab configuration for a respective course to the LMS, wherein the recommended virtual lab configuration for each course is reviewed to accept or modify the recommended virtual lab configuration by an administrator to draft a final lab configuration for the respective course, wherein the intelligent virtual machine configuration repository is an artificial intelligence-based configuration repository that is configured to continually learn based on activities performed including modifications or changes to the recommended virtual lab configuration by the administrator in the LMS to create a LMS specific configuration repository, and wherein the LMS specific configuration repository provides a LMS specific virtual lab configuration recommendation for each course and for newly added courses in the LMS in future,
wherein the intelligent virtual machine configuration repository is configured to store recommended virtual lab configurations against a list of subjects or technologies, wherein for each course, the intelligent virtual machine configuration repository suggests a type of virtual lab that is required for learners to perform tasks including an ideal machine requirement in terms of central processing unit (CPU), memory and operating system, along with information of software tools or applications required for learning practical applications of the respective course;
receiving, by the VLPS, the final lab configuration for each course of the plurality of courses and one or more additional inputs from the LMS, wherein the one or more additional inputs comprise one or more of: an infrastructure-as-a-service (IaaS) platform details, a learner list for each course, a lab availability details for each learner in the learner list of each course, a cool off period details for each course, a faculty virtual machine details for each course, an automation script for one or more courses of the plurality of courses, a LMS application programming interface details, and an attempt details for each course of the plurality of courses, wherein the LMS pushes the final lab configuration for each course to a service manager component of the VLPS via a push VM configuration application programming interfaces (API) and a push learner list API; and creating, by the VLPS, a learner desktop for each learner in the learner list of each course, and one or more reviewer desktops for each course based, at least in part, on the final lab configuration and the additional inputs that are received for the respective course using a virtual machine provisioning and management engine, wherein the learner desktop created for a learner is used as a virtual lab by a respective learner for performing hands on experiments related to a course for which the learner is enrolled, and wherein each reviewer desktop created for a course is used by a reviewer for reviewing work done by each learner on the learner desktop created for the respective course, wherein a method provides plug and play desktops that are created on any available IaaS platform and integrated with any available LMS, ensuring integration while facilitating use of already existing functionalities of the LMS which further ensures easy accessibility for the learners.

16. The one or more non-transitory machine-readable information storage mediums of claim 15, wherein the step of creating the learner desktop for each learner in the learner list of each course and the one or more reviewer desktops for each course based, at least in part, on the final lab configuration and the additional inputs that are received for the respective course using the virtual machine provisioning and management engine comprises:

creating, by the VLPS, a customized template for each course based on the operating system requirement of the respective course;

calculating, by the VLPS, a required number of learner desktops to be created for each course based on the learner list received for the respective course using a predefined desktop creation formula;

determining, by the VLPS, a number of reviewer desktops required for each course based on the received faculty virtual machine details for the respective course;

creating, by the VLPS, a plurality of learner accounts for each course based on the calculated number of the learner desktops, and one or more reviewer accounts based on the determined number of the reviewer desktops using the customized template created for the respective course;

installing, by the VLPS, one or more course specific software applications on the plurality of learner accounts and on the one or more reviewer accounts created for each course based on the list of required software of the respective course using the customized template;

creating, by the VLPS, one or more files and folder structure in each of the plurality of learner accounts, and each of the one or more reviewer accounts; and creating, by the VLPS, the learner desktop for each learner in the learner list of each course based on the learner account of the respective learner, and a reviewer desktop for each reviewer of each course based on the reviewer account of the respective reviewer using one or more application programming interfaces (APIs) offered by an infrastructure-as-a-service platform provided in the IaaS platform details, and the customized template and the final lab configuration of the respective course, wherein each of the learner desktop and the reviewer desktop comprises a unique desktop identification (ID).

17. The one or more non-transitory machine-readable information storage mediums of claim 16, wherein the one or more instructions which when executed by the one or more hardware processors further cause:

mapping, by the VLPS, the learner desktop created for each learner in the learner list of each course to the respective learner using the unique desktop identification.

18. The one or more non-transitory machine-readable information storage mediums of claim 17, wherein the one or more instructions which when executed by the one or more hardware processors further cause:

associating, by the VLPS, the learner desktop mapped to each learner in the learner list of each course with a LMS account of the respective learner in the LMS, wherein the association of the learner desktop of the learner with the LMS account of the respective learner enables the learner account to become part of a normal flow of the LMS; and tracking, by the VLPS, one or more learning activities performed on the learner desktop by each learner in the learner list of each course.

* * * * *